(12) United States Patent
Deurloo

(10) Patent No.: US 9,319,372 B2
(45) Date of Patent: Apr. 19, 2016

(54) SOCIAL FEED TREND VISUALIZATION

(71) Applicant: RTReporter BV, Amsterdam (NL)

(72) Inventor: Marijn Deurloo, Hoofddorp (NL)

(73) Assignee: RTReporter BV, Amsterdam (NL)

( * ) Notice: Subject to any disclaimer, the term of this patent is extended or adjusted under 35 U.S.C. 154(b) by 307 days.

(21) Appl. No.: 13/828,483

(22) Filed: Mar. 14, 2013

(65) Prior Publication Data

US 2013/0275527 A1    Oct. 17, 2013

Related U.S. Application Data

(60) Provisional application No. 61/624,138, filed on Apr. 13, 2012.

(51) Int. Cl.
*G06F 15/16* (2006.01)
*H04L 12/58* (2006.01)

(52) U.S. Cl.
CPC ..................................... *H04L 51/32* (2013.01)

(58) Field of Classification Search
CPC ....................................................... H04L 51/32
USPC ......................................................... 709/206
See application file for complete search history.

(56) References Cited

U.S. PATENT DOCUMENTS

| 2010/0121843 | A1 | 5/2010 | Goeldi | |
| 2011/0041080 | A1 | 2/2011 | Fleischman et al. | |
| 2011/0106589 | A1 | 5/2011 | Blomberg et al. | |
| 2011/0218946 | A1 | 9/2011 | Stern et al. | |
| 2012/0047219 | A1* | 2/2012 | Feng et al. | 709/207 |
| 2012/0221486 | A1* | 8/2012 | Leidner et al. | 705/36 R |
| 2012/0290950 | A1* | 11/2012 | Rapaport et al. | 715/753 |
| 2013/0007057 | A1* | 1/2013 | Li et al. | 707/769 |

OTHER PUBLICATIONS

International Search Report and Written Opinion mailed Aug. 27, 2013, for International Application No. PCT/US2013/036641 filed Apr. 15, 2013.

* cited by examiner

*Primary Examiner* — Glenford Madamba
(74) *Attorney, Agent, or Firm* — Perkins Coie LLP

(57) ABSTRACT

Technology for a visual representation of trending topics on social media platforms is disclosed herein. In some embodiments, a method for presenting a dynamic squarified treemap includes steps of retrieving multiple messages from a social networking service, the messages containing multiple trending topics; for each respective trending topic of the trending topics, determining a trending speed and a trending acceleration of the respective trending topic at a time point; and presenting a treemap including multiple shapes. Each respective shape of the shapes is associated with a corresponding trending topic of the trending topics. An area of the respective shape indicates a trending speed of the corresponding trending topic at the time point. A color of the respective shape indicates a trending acceleration of the corresponding trending topic at the time point.

18 Claims, 10 Drawing Sheets

1) #PrayforMexico
2) temblor
3) Earthquake in Mexico
4) Azcapotzalco
5) John Elway
6) Sismo de 7.8
7) Niñas de 13 y 14
8) #SocialMovies
9) Marcelo Lagos
10) Pat Bowlen

*FIG. 2A*

18m 25km earthquake epicenter guerrero indonesia magnitude mexico oaxaca quake

*FIG. 2B*

(a) Unclustered (b) Clustered

SOCIAL FEED TREND VISUALIZATION

PRIORITY CLAIM

This application claims to the benefit of U.S. Provisional Patent Application No. 61/624,138, entitled "SOCIAL FEED TREND VISUALIZATION", which was filed on Apr. 13, 2012, which is incorporated by reference herein in its entirety.

BACKGROUND

A social networking service is an online service, platform, or site that focuses on building and reflecting of social networks or social relations among people, who, for example, share interests and/or activities and people with similar or somewhat similar interests, backgrounds and/or activities make their own communities. A social network service consists of a representation of each user (often a profile), his/her social links, and a variety of additional services. Most social network services are web-based and provide means for users to interact over the Internet, such as e-mail, and instant messaging. Examples of social networking services include, but are not limited to, Facebook, Twitter, Google+, etc.

Some social networking sites allow users to share ideas, activities, events, and interests within their individual networks or with the public. This information is commonly shared through public and/or private social feeds. Twitter is a social networking service in which users can create short messages or mircoblogs (also called "tweets") related to a wide variety of subjects. Twitter has seen rapid growth since it launched in 2006 and now commands more than 140 million users that generate more than 340 million messages per day. Twitter users can tweet about any topic within a 140-character limit. Like other social networking services, Twitter users can follow others to receive their tweets—which combined form the user's social feed.

An important characteristic of Twitter is its real-time nature. For instance, when a major event occurs, people generate and send tweets that are related to the event over a wide area network such as, for example, the Internet. Transmission of the tweets over the network enables a near immediate detection of the event by observing the tweets over the network. This detection of trending topics enables one to quickly discern what is currently happening in the world. The current happenings or popular events and/or subjects are sometimes referred to as trending topics. Unfortunately, determining the appropriate representation of these trending topics—which has a significant impact on the interpretation of the topics—can be exceedingly difficult.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

FIG. 2A illustrates examples of trending topics on Twitter.

FIG. 2B illustrates an example of a dynamic tag cloud.

DETAILED DESCRIPTION

Figure 1A:
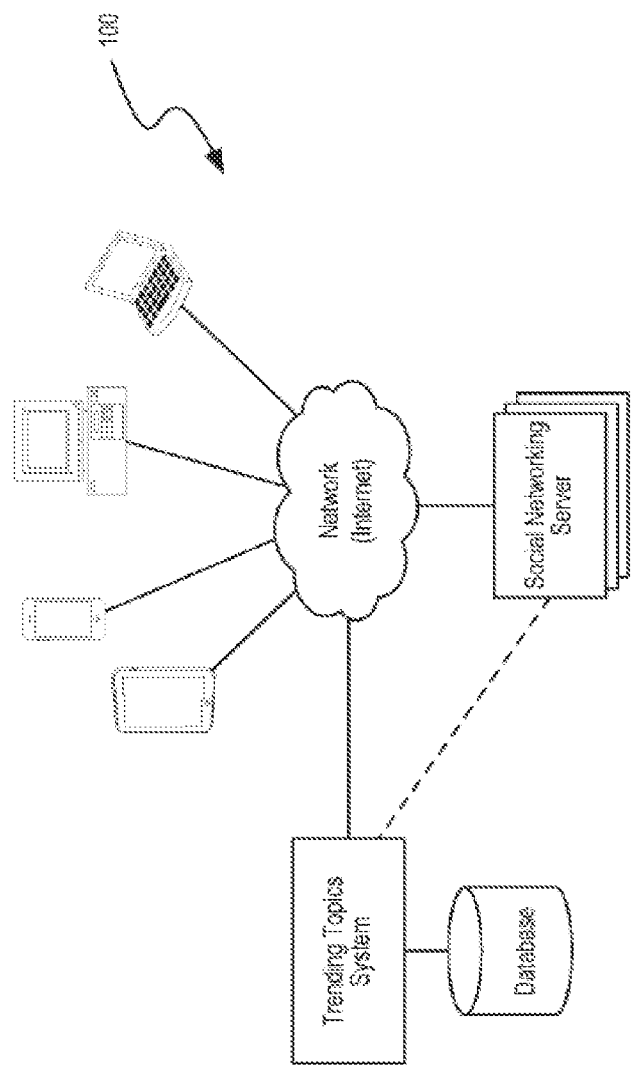
FIG. 1A is a block diagram of environment including a trending topics system.

Described herein are systems, methods, computer-readable media, and graphical user interfaces designed specifically to present a new visual representation of the trending topics based on dynamic squarified treemaps. In order to use this visual representation, the system needs to determine (preferably forecast) the speed at which tweets on a particular subject are posted and to detect acceleration. Moreover, the system needs efficient ways to relate topics to each other when necessary so that clusters of related trending topics are formed to be more informative about a particular subject. Methodologies for determining the speed and acceleration, and for clustering are described herein.

Embodiments of the present disclosure include examples of systems and methods for visual representation of social feed trending topics. More specifically, the embodiments illustrate examples of visually representing social feed trending topics based on dynamic squarified treemaps. The present disclosure is discussed primarily with reference to the Twitter social network; however, it is appreciated that any social network can use the concepts presented herein.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1A depicts a block diagram of environment 100 including a trending topics system suitable for detection of social feeds, processing of the social feeds to determine visualization information of trending topics, and sending the visualization information to users of a social networking service for display on electronic devices. Environment 100 includes a plurality of client devices, a trending topics system, one or more social network servers, and a network. Although shown as separate components, it is appreciated that the trending topics system may be included, in whole or in part, within one or more of the social networking servers. The social web servers may comprise servers from any social networking websites, including combinations thereof. For example, social web servers may be one or more Facebook servers and/or one or more Twitter servers.

The plurality of client devices can be any systems, devices, and/or any combination of devices/systems that are able to establish a connection with another device, server and/or other system. The client devices typically include user interfaces. The user interfaces can include one or more input devices and a display or other output functionalities to present data exchanged between the devices to a user, including the trend visualization data. For example, the client devices can include, but are not limited to, a server desktop, a desktop computer, a computer cluster, a mobile computing device such as a notebook, a laptop computer, a handheld computer, a mobile phone, a smart phone, a PDA, a BlackBerry™ device, a Treo™, and/or an iPhone or Droid device, etc. In one embodiment, the client devices are coupled to the network.

The network, to which the client devices, trending topics system and social networking servers are coupled, can be a telephonic network, an open network, such as the Internet, or a private network, such as an intranet and/or the extranet. For example, the Internet can provide file transfer, remote log in, email, news, RSS, and other services through any known or convenient protocol, such as, but not limited to the TCP/IP protocol, Open System Interconnections (OSI), FTP, UPnP, iSCSI, NSF, ISDN, PDH, RS-232, SDH, SONET, etc. The network 190 can be any collection of distinct networks operating wholly or partially in conjunction to provide connectivity to the client devices, trending topics system and social networking servers. In one embodiment, communications to and from the client devices and to and from the social networking server and trending topics system can be achieved by, an open network, such as the Internet, or a private network, such as an intranet and/or the extranet.

In one embodiment, the social networking servers comprise Twitter servers. Twitter users (e.g., clients) can tweet about any topic within the 140-character limit and follow others to receive their tweets. As discussed, an important characteristic of Twitter is its real-time nature. For example, when a major event occurs, people disseminate tweets over the network related to the event, which enables detection of the event promptly, simply by observing the tweets. The popular events and subjects are also known as trending topics, and their detection assist in understanding what is happening in the world.

Figure 1B:
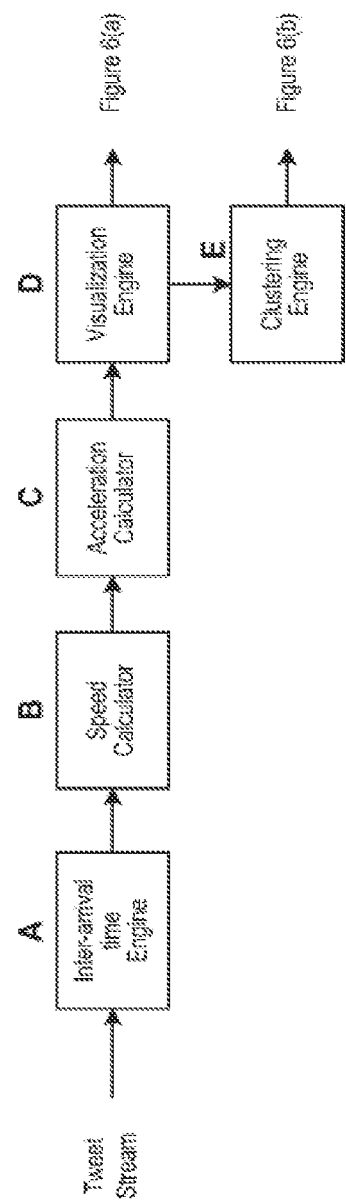
FIG. 1B illustrates a more detailed example of the trending topics system.
Figure 3:
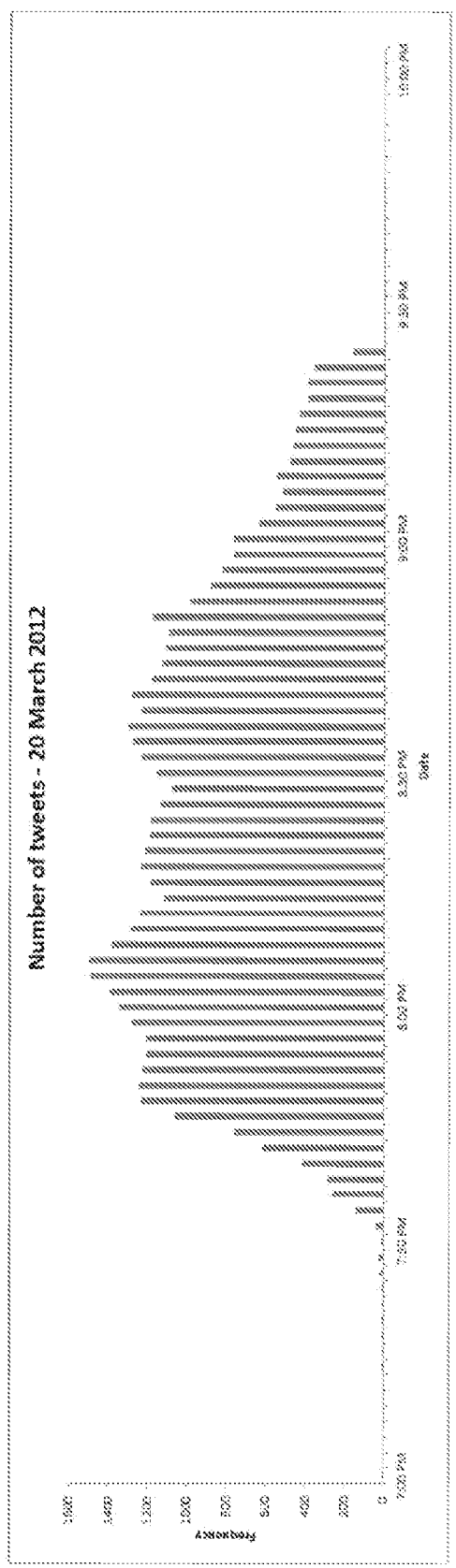
FIG. 3 is a bar diagram illustrating numbers of messages for a trending topic on a particular day.
Figure 6A:
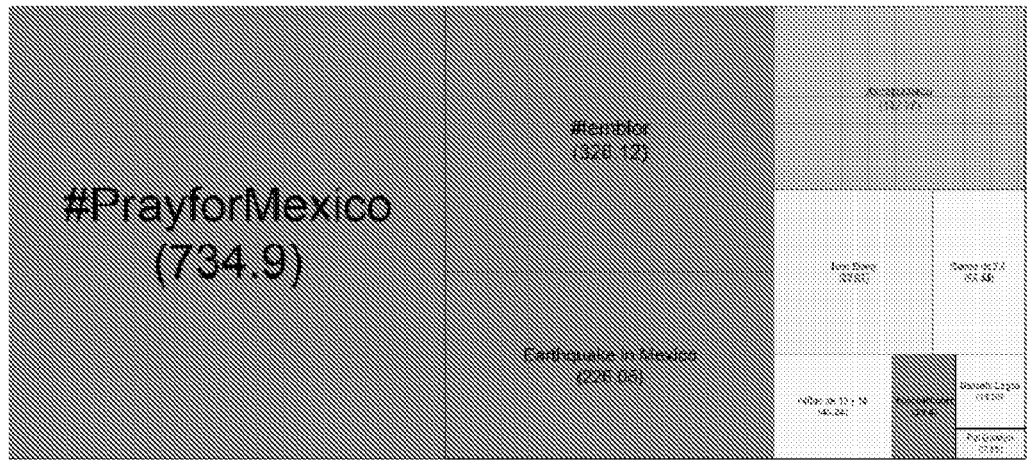
FIGS. 6A and 6B illustrates visual representation of trending topics in dynamic squarified treemaps.
Figure 6B:
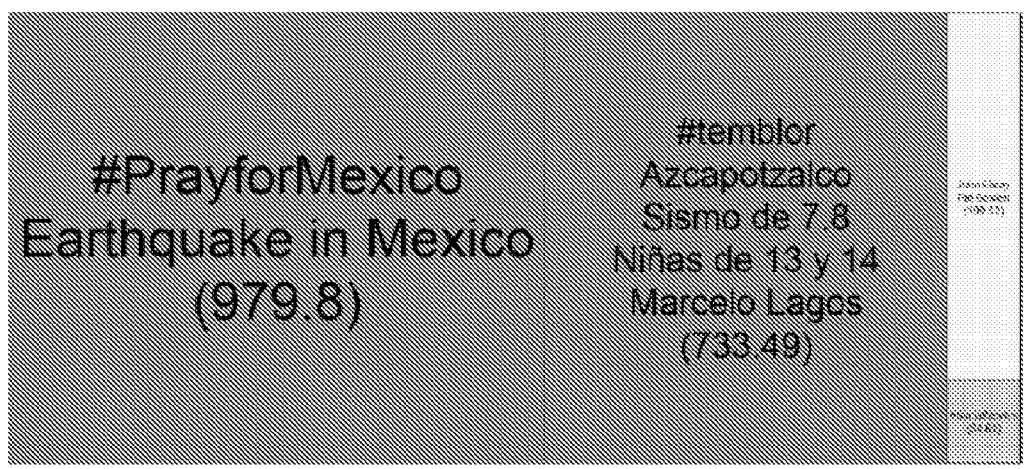

FIG. 1B illustrates a more detailed example of the trending topics system, according to an embodiment. The trending topics system includes an interarrival time engine A, a speed calculator B, an acceleration calculator C, a visualization engine D, and a clustering engine E. Example output (both clustered and unclustered) is shown in FIGS. 6A and 6B. The remaining disclosure discusses operation and examples of the aforementioned blocks.

FIG. 2A illustrates trending topics on Twitter. The visualization of trending topics is an important question because the representation of the trending topics has a significant impact on the interpretation of the topics by the user. The visualization of trending topics can be done simply by providing a list of topics, as Twitter currently does (see FIG. 2A). However, this representation suffers from a number of drawbacks that prevent the user in assessing the importance of the topic correctly. First, although the list is ordered from the most popular topic to the least popular topic, one cannot infer the importance of each topic relative to the other topics. Second, a list also does not convey the dynamics in the trend, e.g., is the topic still trending to become more popular or is a different topic growing more popular? Third, it could very well be that several topics on the list are related to each other and should be grouped into a coherent set of topics. That is, it is not currently clear whether topics in FIG. 1 are related to each other. In this example, the first four topics are related. This group of topics could provide more semantics to users than a single topic alone.

Figure 2B:
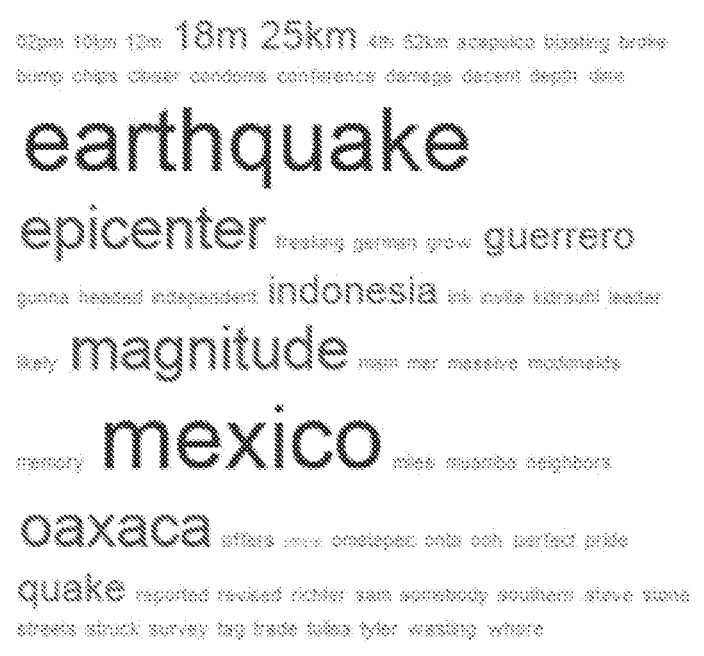

FIG. 2B illustrates a dynamic tag cloud. Tag clouds are a popular method to visualize trending topics. However, the research on the effectiveness of this visualization technique is not conclusive. For example, sometimes a simple list ordered by frequency may work better in practice than fancy sequential or spatial tag clouds. In other research, an alphabetically ordered list performed best with variations in the font size (i.e., bigger font for more important topics worked better). Some results show that the font size and the font weight have stronger visual effects than the intensity, the number of characters, or a tag area. Nonetheless, when several visual properties are manipulated at once, there is no single property that stands out above the others according to research. Some researchers have even argued that the limited research on the usefulness of tag clouds for understanding information and for other information processing tasks suggests that they are (unsurprisingly) inferior to a more standard alphabetical listing.

A dynamic cloud tag addresses the first two of the three shortcomings of lists to some extent. The importance of each topic is displayed by the font size in the cloud tag. The dynamics of the trend can be implemented by a dynamic cloud tag in which the text size grows or shrinks. However, the last shortcoming for addressing topics that are a related to each other is more difficult. In this case, one needs to cluster trending topics into coherent groups and visualize them. In order to visualize these clusters, one could use a Treemap or a Squarified Treemap.

A treemap displays hierarchical data as a set of nested rectangles. The system and methods disclosed herein use a Dynamic Squarified Treemap (see FIGS. 6A and 6B) to overcome all three aforementioned shortcomings. Advantageously, the importance of a topic can then be correlated to the size of a rectangle. The color of the rectangle can be used to identify if the topic is trending upwards, downwards or remaining at a steady popularity. The rectangle itself can harbor multiple topics so that clusters can be visually represented in an appealing manner. In order to use this visual representation, we need to define how to choose the importance (which is directly related to the number of tweets per minute on the topic) and how to choose the color (which is directly related to the acceleration or deceleration of the number of tweets per minute). In the following section, we outline the methodology to determine these parameters.

The methodology to determine the speed of tweets and the acceleration is now discussed with reference to FIGS. 3-6. The speed and acceleration parameters serve as input parameters for a dynamic squarified treemap to generate a visualization of the trending topics.

Twitter speed of a specific topic is discussed first. For this purpose, we use the trending topics as shown FIG. 2A. To illustrate the techniques, we focus on the tweets in hashtag #PrayforMexico. Assume that this hashtag is a trending topic as a result of an earthquake in Mexico. The data derived from this hashtag consists of tweets with a time stamp (with seconds as accuracy). Although it is appreciated that the accuracy may be defined in any units. Based on this data, the absolute number of tweets over the day is given in FIG. 3. One can see that around 7:30 pm the number of tweets rapidly increases due to the earthquake.

A. Inter-Arrival Time Engine and B. Speed of Tweets

For ease of notation the discussion is focused on a stream of tweets on a particular subject for which the twitter speed needs to be determined. Let us denote by $t_i$ the time stamp of the i-th tweet with $t_1 \leq t_2 \leq \ldots$. The speed can in principle be determined by a simple moving average, e.g., when tweet n arrives, the speed $v_n$ can be determined by $k/(t_n - t_{n-k})$ for some k that determines how much history is included. There are two significant drawbacks to such a method. First, for high volume tweets (in particular, for popular topics), many tweets have the same time stamp. Thus, it could be that $t_n = \ldots = t_{n-k}$ so that $v_n$ cannot be computed. Second, such an approach looks back at the history and has little predictive power.

To alleviate the drawback of the moving average, we first determine the interarrival times $a_n = t_n - t_{n-1}$. When tweet n is recorded, it could be that there are already several tweets that have the same time stamp (this is the case $a_n = 0$). This number is given by $z_n = |\{k \leq n | t_n = t_k\}|$. Hence, we adjust the time stamp of the tweets by spreading them uniformly over the past millisecond. Thus, we transform $a_n$ to $a'_n$ by $$a'_n = \begin{cases} \left(a_n - \left(1 - \frac{1}{z_n + 1}\right)\right) / (24 \cdot 60 \cdot 60), & a_n > 0, \\ \left(1 - \frac{1}{z_{n+1}}\right) / (24 \cdot 60 \cdot 60), & a_n = 0 \end{cases}$$

Next, we apply exponential smoothing with parameter $0 \leq \alpha \leq 1$ on the way interarrival times to derive a new time series $b_n$ given by $$b_n = \alpha b_{n-1} + (1-\alpha) a'_n,$$

starting with $b_0 = 0$. If the resulting time series can still be volatile, a double smoothing can be applied by taking the average over the past k values of the time series $b_n$. Thus, the speed $v_n$ (in tweets per second) is then given by $$v_n = \frac{k}{\sum_{i=n-k+1}^{n} b_n} \cdot (24 \cdot 60).$$

Figure 4:
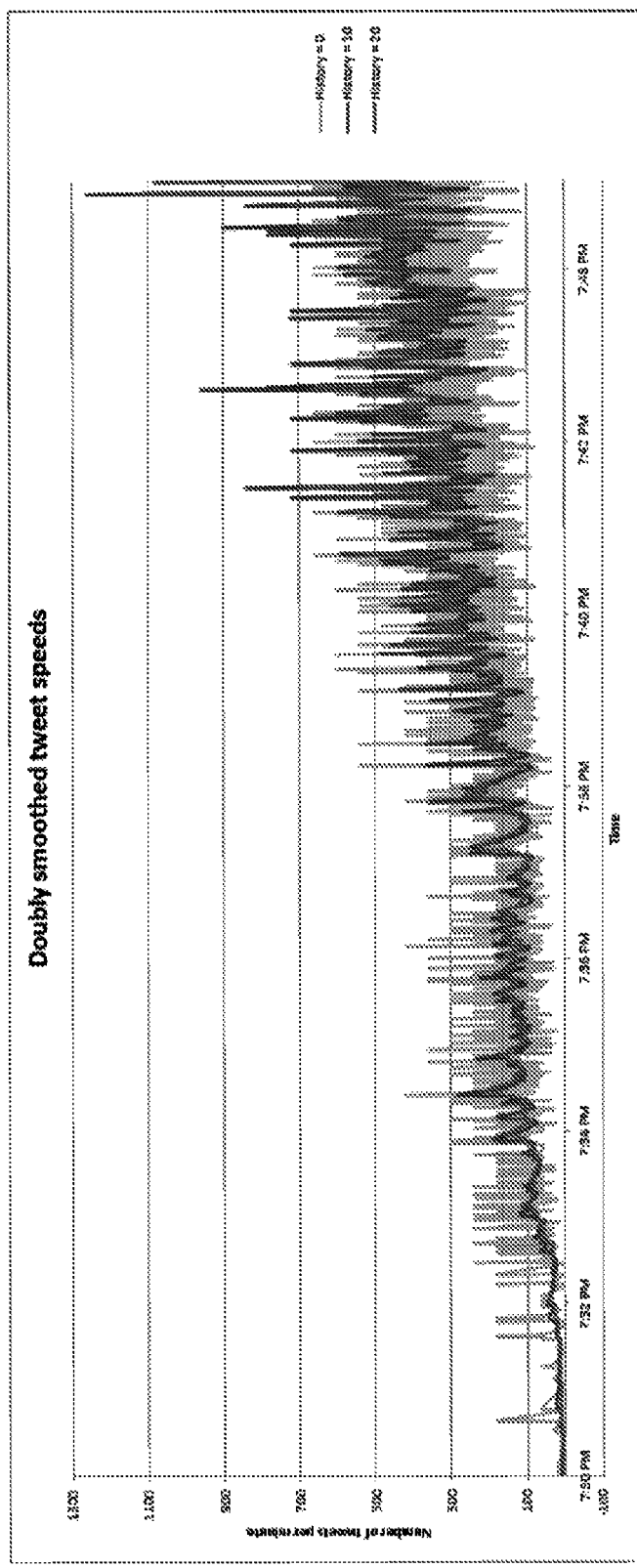
FIG. 4 illustrates time series of messages per second for a trending topic with different k (history) values.

Thus, the disclosed algorithm has two parameters that can be chosen freely and or determined dynamically in one or more embodiments. The first smoothing parameter $\alpha$ that is used in the exponential smoothing, and we have the second smoothing parameter k that uses k tweets from history. In FIG. 4 we can see the graph of the tweets from #PrayforMexico for various values of k. The parameter $\alpha$ is set to 0.8 (or any other predetermined value), which seems to work best for various examples in our setting. We can see that a value of k=0, the case in which no history is taken into account, is rather volatile and does not produce stable results. The values of k=10 and k=20 provide more stable results and are much smoother than the graph for k=0.

C. Acceleration of Tweets Calculator

The acceleration of tweets is basically a derivative of the speed of the tweets. We calculate the acceleration of the tweets for each minute. Let t be the start of a minute (or another predetermined time period) and t+1 the start of the next minute (or the other predetermined time period). Let be the index of the last tweet before the end of the minute, thus $\bar{z}_t = \max\{n | a'_n < t+1\}$. Denoted by $\underline{z}_t$ the first tweet in that minute, or if there are not any, the one before that. Thus $\underline{z}_t = \max\{\min\{n | t \leq a_n' < t_{\bar{z}_t}\}, \bar{z}_t - 1\}$. The acceleration $w_t$ is then computed by $$w_t = \frac{v_{\bar{z}_t} - v_{\underline{z}_t}}{a'_{\bar{z}_t} - a'_{\underline{z}_t}}$$

Note that the definition reflects the regular definition of a derivative. However, we account for the fact that there can be a situation when there are zero tweets in a particular minute. This is taken care by the way the variable $\bar{z}_t$ and $\underline{z}_t$ are defined. Furthermore, we also account for the fact that all tweets in the minute can have the same time stamp. Therefore, we use the adjusted timestamps $a'_n$ instead of $a_n$.

Figure 5:
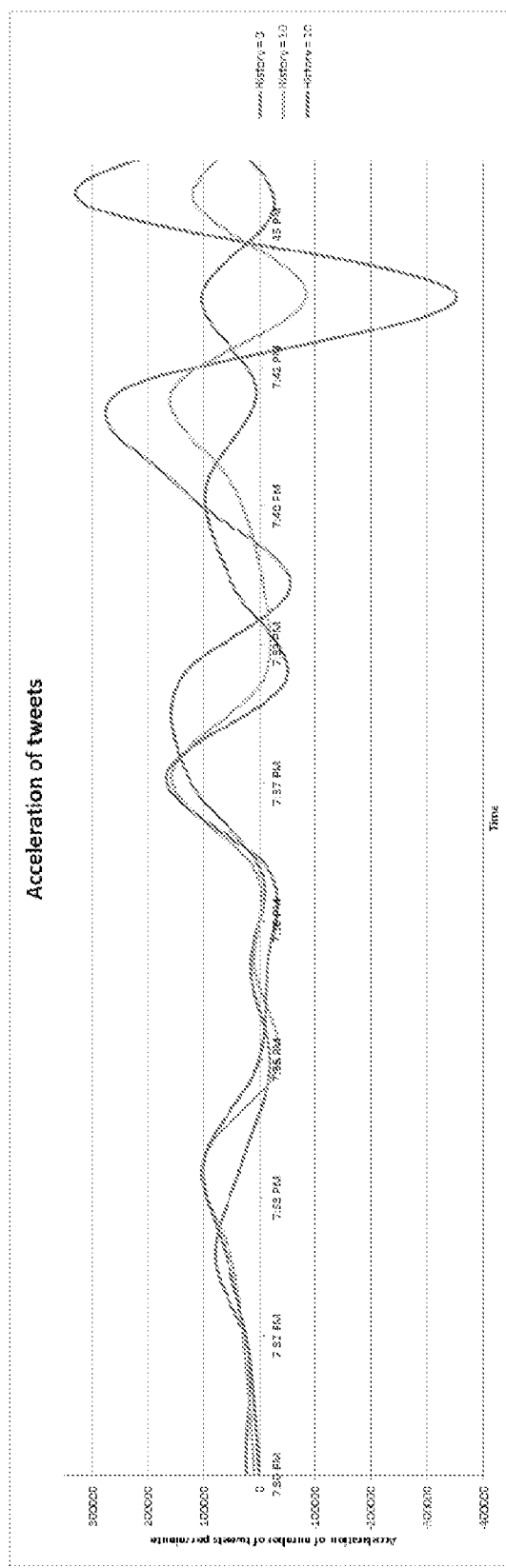
FIG. 5 illustrates acceleration of the number of messages per second for a trending topic with different k (history) values.

FIG. 5 illustrates the acceleration of the number of tweets per second for different values of k (history) for #PrayforMexico on 20 Mar. 2012. More specifically, in FIG. 5 the graph of the acceleration of the number of tweets per second for different values of k (the history that is used to determine $v_n$) is shown. As in the case of the calculation of the speed, we conclude that k=0 (i.e. not using any history at all) results in volatile accelerations that are not preferred. Since the graph of speeds when using k=10 is still very bursty, the acceleration shows large fluctuations that are not in accordance with ones intuition (see, e.g., the timestamps around 7:42 pm). The graph with k=20, however, seems to perform well in this case, and in other cases as well. We can clearly see that the acceleration is picked up at 7:32 pm, which corresponds to a real surge in the absolute number of tweets. Thus, this is precisely the moment at which one would like to detect this trend. Accordingly, in one embodiment (as discussed herein), the algorithms run with $\alpha = 0.8$ and k=20.

Although the above embodiments use tweets as example, the technologies disclosed herein can be applied to any social media messages, online messages, or electronic messages, as readily appreciated by a person having ordinary skill in the art.

D. Visualization Engine

The visualization engine generates the Dynamic Squarified Treemaps. In the previous section, we have identified the major ingredients for building a squarified treemap. First, we have determined the variable vn, which represents the twitter speed in tweets per second on a particular topic. Second, we have identified the acceleration wt of the number of tweets for the same topic. Based on this information, we can build rectangles for each topic of which the relative areas correspond to the relative speeds of each topic. On top of that, each rectangle can be color-coded from green to white to red based on a positive to neutral to negative acceleration. This gives rise to a representation as depicted in FIG. 6A. The numbers in parentheses represent vn. It is clear that this representation solves many of the issues tied to lists (see FIG. 2A) and tag clouds (see FIG. 2B).

E. Clustering Engine

In this section, we improve the visual representation by clustering related topics. The clustering of tweets is not an easy process. Standard algorithms, such as K-means clustering, are slow. Therefore, most algorithms usually work iteratively. For speed, a single assignment is usually used in the literature. A simple way to cluster tweets is term frequency and inverse document frequency (TF-IDF). The clustering of the tweets takes place by using a cosine similarity. An adapted version of this similarity metric is also used for New Event Detection (NED). On blog posts, an alternative version based on graph theory is used for tracking keywords that suddenly started to co-occur. A more involved method to cluster tweets is Latent Semantic Analysis (LSA), which is used in. In its more general form this is a subset of Latent Dirichlet Allocation (LDA) and can be used to track topics over time. The clustering that is obtained by this method is better than when using TF-IDF (while a combination works best). However, LDA is not perfect for Twitter because tweets are limited in size.

Methods based on nonnegative Matrix Factorization could be an alternative to TF-IDF and LDA. Some experimentation has already been performed in on a small dataset. Combinations and variations of the described methods is also possible. For example, one can include a mixture of models or methods which were developed for producing recommendations, for clustering tweets, etc.

Clustering can also be based on tweet list comparison. As a first clustering algorithm the system may adopt a very simple but efficient clustering algorithm. For each topic a, at time t, the system keeps a list la of the last 100 tweets counting back from time t. The system's similarity metric for topic a and topic b is defined as the number of times that both terms a and b appear in the lists $l_a$ and $l_b$. If the similarity metric is above the threshold of 0.15, then the two topics are clustered. Table I (below) displays the results of this clustering. In the results we can see that '#PrayforMexico' and 'Earthquake in Mexico' are clustered.

TABLE I

| CLUSTERING BASED ON COMPARISON OF TWEET LISTS. | | | | | | | | | | |
|---|---|---|---|---|---|---|---|---|---|---|
| | #PrayforMexico | #temblor | Earthquake in Mexico | Azcapotzalco | John Elway | Sismo de 7.8 | Ninas de 13 y 14 | #SocialMovies | Marcelo Lagos | Pat Bowlen |
| #PrayforMexico | 1 | 0.01 | 0.18 | 0.01 | 0.01 | 0.04 | 0 | 0.01 | 0.01 | 0 |
| #temblor | 0.01 | 1 | 0.02 | 0.02 | 0.01 | 0.01 | 0 | 0.01 | 0.01 | 0 |
| Earthquake in Mexico | 0.18 | 0.02 | 1 | 0.01 | 0.01 | 0.03 | 0 | 0.01 | 0.01 | 0 |
| Azcapotzalco | 0.01 | 0.02 | 0.01 | 1 | 0.01 | 0.01 | 0 | 0.01 | 0.01 | 0 |
| John Elway | 0.01 | 0.01 | 0.01 | 0.01 | 1 | 0.01 | 0 | 0.01 | 0.01 | 0.04 |
| Sismo de 7.8 | 0.04 | 0.01 | 0.03 | 0.01 | 0.01 | 1 | 0 | 0.01 | 0.01 | 0 |
| Ninas de 13 y 14 | 0 | 0 | 0 | 0 | 0 | 0 | 1 | 0 | 0 | 0 |
| #SocialMovies | 0.01 | 0.01 | 0.01 | 0.01 | 0.01 | 0.01 | 0 | 1 | 0.01 | 0 |
| Marcelo Lagos | 0.01 | 0.01 | 0.01 | 0.01 | 0.01 | 0.01 | 0 | 0.01 | 1 | 0 |
| Pat Bowlen | 0 | 0 | 0 | 0 | 0.04 | 0 | 0 | 0 | 0 | 1 |

In one embodiment, messages (e.g. tweets) can be clustered using by a cosine similarity index. The cosine similarity of two topics a and b is a measure of similarity between, defined by $$\frac{\langle f_a, f_b \rangle}{\|f_a\| \cdot \|f_b\|} = \frac{\sum_i f_a(i) f_b(i)}{\sqrt{\sum_i f_a(i)^2} \sqrt{\sum_i f_b(i)^2}},$$

Where the vector $f_a$ (and $f_b$) is the frequency list of terms that appear in the list $l_a$ (and $l_b$). the cosine similarity is bounded between 0 and 1 since both $f_a$ and $f_b$ are non-negative. The name of the similarity index is derived from the interpretation of the cosine of the angle between the two vectors. Hence, similar vectors (with an angle close to zero) have a high cosine similarity, whereas vectors that are not similar (with an angle close to $\pi/2$) have a low cosine similarity. If the similarity metric is above the threshold of 0.30 (or any other predetermined threshold value), then the two topics are clustered. Table II displays the results of this clustering. In the results we can see that '#PrayforMexico' and 'Earthquake in Mexico' are one cluster, but '#temblor', 'Azcapotzalco', 'Sismo de 7.8', 'Ninas de 13 y 14', and 'Marcelo Lagos' from one cluster in addition, as well as 'John Elway' and 'Pat Bowlen'.

FIG. 6B shows the squarified treemap for the clustered topics. In some other embodiments, treemap can have shapes other than squares. The clusters in the FIG. 6B shows that 'Azcapotzalco' is related to the earthquake in Mexico. The clustered squarified treemap resolves the three issues that were mentioned as problems with lists and tag clouds. The treemap can also be made dynamic by updating it in an animated manner periodically. This has the visual advantage of seeing the rectangles grow/shrink and change its color.

TABLE II

CLUSTERING BASED ON THE COSINE SIMILARITY INDEX.

| | #PrayforMexico | #temblor | Earthquake in Mexico | Azcapotzalco | John Elway | Sismo de 7.8 | Ninas de 13 y 14 | #SocialMovies | Marcelo Lagos | Pat Bowlen |
|---|---|---|---|---|---|---|---|---|---|---|
| #PrayforMexico | 1 | 0.30 | 0.70 | 0.21 | 0.14 | 0.27 | 0.19 | 0.16 | 0.21 | 0.13 |
| #temblor | 0.30 | 1 | 0.20 | 0.47 | 0.11 | 0.54 | 0.41 | 0.12 | 0.42 | 0.10 |
| Earthquake in Mexico | 0.70 | 0.20 | 1 | 0.15 | 0.16 | 0.17 | 0.11 | 0.16 | 0.14 | 0.15 |
| Azcapotzalco | 0.21 | 0.47 | 0.15 | 1 | 0.08 | 0.48 | 0.33 | 0.09 | 0.33 | 0.08 |
| John Elway | 0.14 | 0.11 | 0.16 | 0.08 | 1 | 0.06 | 0.06 | 0.11 | 0.08 | 0.32 |
| Sismo de 7.8 | 0.27 | 0.54 | 0.17 | 0.48 | 0.06 | 1 | 0.48 | 0.08 | 0.38 | 0.06 |
| Ninas de 13 y 14 | 0.19 | 0.41 | 0.11 | 0.33 | 0.06 | 0.46 | 1 | 0.06 | 0.33 | 0.06 |
| #SocialMovies | 0.16 | 0.12 | 0.16 | 0.09 | 0.11 | 0.05 | 0.06 | 1 | 0.10 | 0.11 |
| Marcelo Lagos | 0.21 | 0.42 | 0.14 | 0.33 | 0.08 | 0.33 | 0.33 | 0.39 | 1 | 0.07 |
| Pat Bowlen | 0.13 | 0.19 | 0.15 | 0.08 | 0.32 | 0.06 | 0.06 | 0.11 | 0.07 | 1 |

Systems and methods for generating a dynamic squarified treemap for visually representing the trending topics on Twitter are discussed herein. The main ingredients for this graph are the speed of tweets and the acceleration of them. Algorithms to calculate both of the speed and the acceleration are disclosed. Moreover, a clustering algorithm to deal with grouping related topics in online twitter streams is discussed. The disclosed dynamic squarified treemap fills the gaps that are present in list and tag cloud representations. Hence, the dynamic squarified treemap forms a powerful visual tool to visualize trending topics. The systems and methods as disclosed herein have been discussed with reference to the trending topics based on the list provided by Twitter. However, monitoring and capturing this information in the system is also possible. In addition, information can be captured from more than one social networking site (e.g., Facebook, Twitter, and Google+). Capture of the trending data by the system could, e.g., be based on the size and rate of growth of a cluster of words/topics. The dynamic squarified treemap can then serve as an early warning system in which topics that can become a trend can be visualized.

Figure 7:
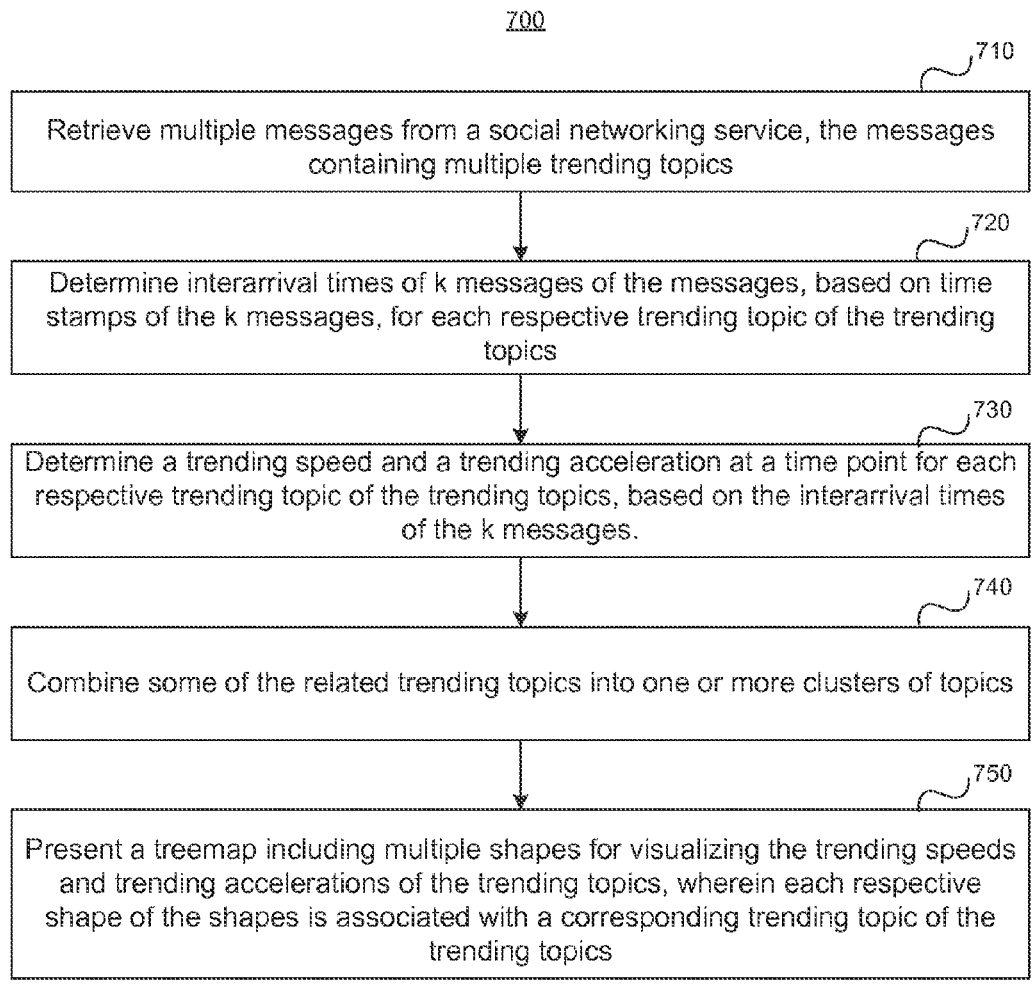
FIG. 7 is a flow diagram illustrating an example of a process for visualizing trending topics using dynamic treemaps.

FIG. 7 is a flow diagram illustrating an example of a process 700 for visualizing trending topics using dynamic treemaps. At step 710 of the process 700, the trending topic system (also referred to as "system" herein) retrieves multiple messages from a social networking service, the messages containing multiple trending topics.

At step 720, the system determines interarrival times of k messages of the messages, based on time stamps of the k messages, for each respective trending topic of the trending topics. The k messages are last k messages by the time point that contain the respective trending topic. k is a predetermined number. In one embodiment, the interarrival times of the k messages are generated by spreading the time stamps of the k messages uniformly over a predetermined time period. In another embodiment, the interarrival times of the k messages are generated by applying an exponential smoothing with a predetermined smoothing factor. In yet another embodiment, the interarrival times of the k messages are generated by applying both the spreading and exponential smoothing mentioned above. In still another embodiment, the interarrival times of the k messages can be generated by applying other types of spreading and/or smooth techniques.

At step 730, the system determines a trending speed and a trending acceleration at a time point for each respective trending topic of the trending topics, based on the interarrival times of the k messages. In one embodiment, the trending acceleration of the respective trending topic at the time point depends on a difference between the trending speed of the respective trending topic at the time point and a trending speed of the respective trending topic at a next time point.

Optionally at step 740, the system at least combines some of the related trending topics into one or more clusters of topics. In one embodiment, the related trending topics are trending topics each of which appears in a list of last m messages from the time point for at least n times; wherein m is a predetermined number, and n is a predetermined threshold value. In another embodiment, the related trending topics are trending topics that have a cosine similarity index larger than a predetermined threshold value.

At step 750, the system presents a treemap including multiple shapes for visualizing the trending speeds and trending accelerations of the trending topics. Each respective shape of the shapes is associated with a corresponding trending topic of the trending topics. An area of the respective shape indicates a trending speed of the corresponding trending topic at the time point. A color (or another property in some other embodiments) of the respective shape indicates a trending acceleration of the corresponding trending topic at the time point.

Figure 8:
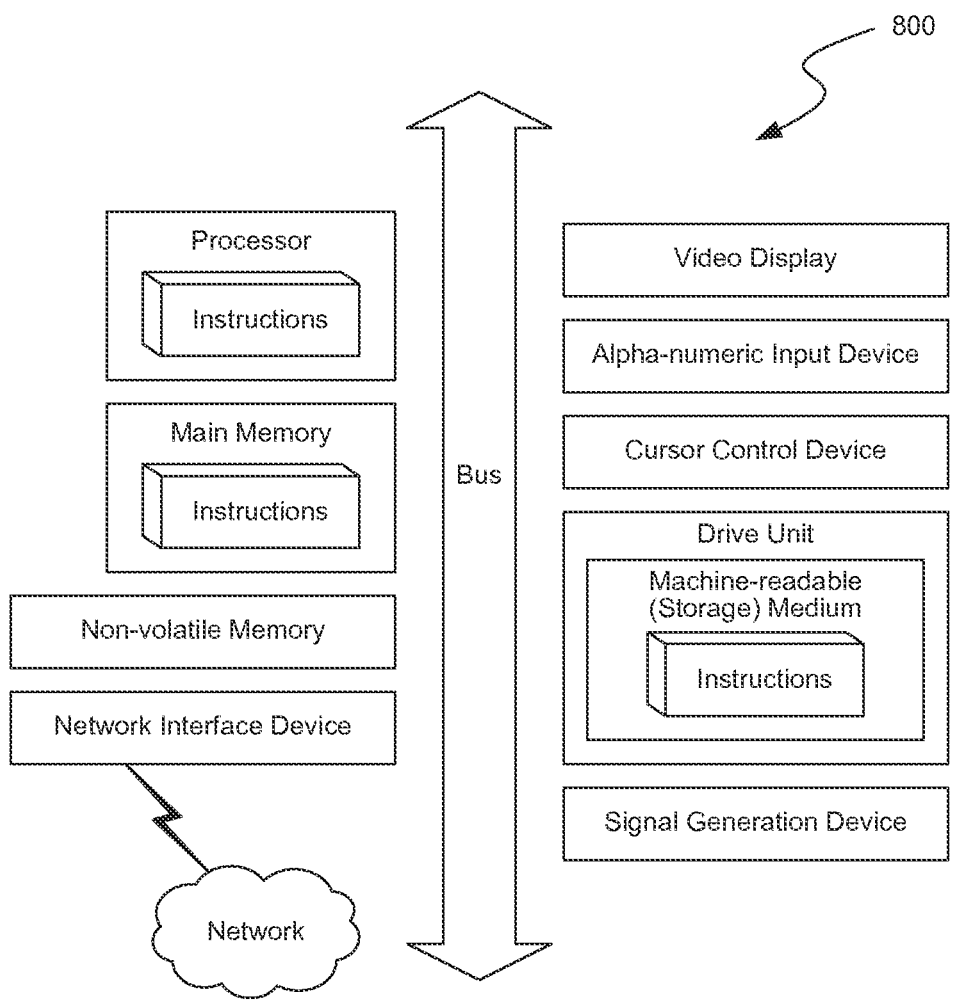
FIG. 8 is a high-level block diagram illustrating an example of the architecture of a processing system, which may any electronic device or server mentioned herein.

FIG. 8 shows a diagrammatic representation of a machine in the example form of a computer system 800 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (e.g., a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiment.

What is claimed is:

1. A method comprising:
retrieving, at a computer device, multiple messages from a social networking service, the messages containing multiple trending topics;
for each respective trending topic of the trending topics, determining by the computer device interarrival times of k messages of the messages, based on time stamps of the k messages, wherein the k messages are last k messages by the time point that contain the respective trending topic, and k is a predetermined number;
for each respective trending topic of the trending topics, determining by the computer device a trending speed and a trending acceleration of the respective trending topic at a time point, wherein the trending speed of the respective trending topic at the time point is determined based on the interarrival times of the k messages by $$v_n = \frac{k}{\sum_{i=n-k+1}^{n} b_n} \cdot (24 \cdot 60)$$

wherein $v_n$ is the trending speed at $n_{th}$ time point among the time stamps of the messages $b_n$ is the interarrival time of the message at $n_{th}$ time point among the time stamps of the messages; and
presenting, by the computer device, a treemap including multiple shapes;
wherein each respective shape of the shapes is associated with a corresponding trending topic of the trending topics, an area of the respective shape indicates a trending speed of the corresponding trending topic at the time point, and a property of the respective shape indicates a trending acceleration of the corresponding trending topic at the time point.

2. The method of claim 1, wherein the property of the respective shape is a color of the respective shape.

3. The method of claim 1, wherein the interarrival times of the k messages are generated by spreading the time stamps of the k messages uniformly over a predetermined time period.

4. The method of claim 3, wherein the interarrival time is determined by $$a'_n = \begin{cases} \left(a_n - \left(1 - \frac{1}{z_n+1}\right)\right) \Big/ (24 \cdot 60 \cdot 60), & a_n > 0, \\ \left(1 - \frac{1}{z_{n+1}}\right) \Big/ (24 \cdot 60 \cdot 60), & a_n = 0. \end{cases}$$

wherein $a_n$ is the interarrival time of the message at $n_{th}$ time point among the time stamps of the messages before the spreading, $a'_n$ is the interarrival time of the message at $n_{th}$ time point among the time stamps of the messages after the spreading, $z_n$ is a number of messages that have the same time stamp as $n_{th}$ time point among the time stamps of the messages.

5. The method of claim 1, wherein the interarrival times of the k messages are generated by applying an exponential smoothing with a predetermined smoothing factor.

6. The method of claim 5, wherein the interarrival time is determined by $$b_n = \alpha b_{n-1} + (1-\alpha)a'_n$$

wherein $b_n$ is the interarrival time of the message at $n_{th}$ time point among the time stamps of the messages after the exponential smoothing, $a'_n$ is the interarrival time of the message at $n_{th}$ time point among the time stamps of the messages before the exponential smoothing, a is the predetermined smoothing factor.

7. The method of claim 1, wherein the trending speed is determined by $$a'_n = \begin{cases} \left(a_n - \left(1 - \dfrac{1}{z_n + 1}\right)\right) / (24 \cdot 60 \cdot 60), & a_n > 0, \\ \left(1 - \dfrac{1}{z_{n+1}}\right) / (24 \cdot 60 \cdot 60), & a_n = 0. \end{cases}$$

$$b_n = \alpha b_{n-1} + (1-\alpha)a'_n$$

$$v_n = \dfrac{k}{\sum_{i=n-k+1}^{n} b_n} \cdot (24 \cdot 60)$$

wherein $a_n$ is the interarrival time of the message at $n_{th}$ time point among the time stamps of the messages before a spreading, $a'_n$ is the interarrival time of the message at $n_{th}$ time point among the time stamps of the messages after the spreading, $z_n$ is a number of messages that have the same time stamp as $n_{th}$ time point among the time stamps of the messages;

wherein $b_n$ is the interarrival time of the message at $n_{th}$ time point among the time stamps of the messages after an exponential smoothing, $\alpha$ is the predetermined smoothing factor; and wherein $v_n$ is the trending speed at $n_{th}$ time point among the time stamps of the messages.

8. The method of claim 1, further comprising:
for each respective trending topic of the trending topics, determining interarrival times of k messages of the messages, based on time stamps of the k messages, wherein the k messages are last k messages by the time point that contain the respective trending topic, and k is a predetermined number; and wherein the trending acceleration of the respective trending topic at the time point is determined based on the interarrival times of the k messages.

9. The method of claim 8, wherein the trending acceleration of the respective trending topic at the time point depends on the trending speed of the respective trending topic at the time point, and the trending speed of the respective trending topic at the time point depends on the interarrival times of the k messages.

10. The method of claim 8, wherein the trending acceleration of the respective trending topic at the time point depends on a difference between the trending speed of the respective trending topic at the time point and a trending speed of the respective trending topic at a next time point.

11. The method of claim 1, wherein at least one trending topic of the trending topics is a topic cluster including multiple related trending topics.

12. The method of claim 11, wherein the related trending topics are trending topics each of which appears in a list of last m messages from the time point for at least n times, m is a predetermined number, n is a predetermined threshold value.

13. The method of claim 11, wherein the related trending topics are trending topics that have a cosine similarity index larger than a predetermined threshold value.

14. A method comprising:
retrieving, at a computer device, multiple messages from a social networking service, the messages containing at least one trending topic;
for each respective trending topic of the at least one trending topic, determining by the computer device interarrival times of k messages of the messages, based on time stamps of the k messages, wherein the k messages are last k messages by the time point that contain the respective trending topic, and k is a predetermined number, wherein the interarrival times of the k messages are generated by spreading the time stamps of the k messages uniformly over a predetermined time period:

$$a'_n = \begin{cases} \left(a_n - \left(1 - \dfrac{1}{z_n + 1}\right)\right) / (24 \cdot 60 \cdot 60), & a_n > 0, \\ \left(1 - \dfrac{1}{z_{n+1}}\right) / (24 \cdot 60 \cdot 60), & a_n = 0. \end{cases}$$

wherein a is the interarrival time of the message at $n_{th}$ time point among the time stam s of the messages before the spreading $a'_n$ is the interarrival time of the message at $n_{th}$ time point among the time stamps of the messages after the spreading, $z_n$ is a number of messages that have the same time stamp as $n_{th}$ time point among the time stamps of the messages;

selecting a series of time points based on time stamps of the messages;

for each respective time point of the series of time points, determining by the computer device a trending speed of the trending topic at the respective time point based on the interarrival times of the k messages; and presenting by the computer device a time series of the trending speeds of the trending topic.

15. A method comprising:
retrieving, at a computer device, multiple messages from a social networking service, the messages containing at least one trending topic;
for each respective time point of the series of time points, determining by the computer device interarrival times of k messages of the messages, based on time stamps of the k messages, wherein the k messages are last k messages by the respective time point that contain the trending topic, and k is a predetermined number;

selecting a series of time points based on time stamps of the messages;

for each respective time point of the series of time points, determining a trending speed of the trending topic at the respective time point based on the interarrival times of the k messages by $$v_n = \dfrac{k}{\sum_{i=n-k+1}^{n} b_n} \cdot (24 \cdot 60)$$

wherein $v_n$ is the trending seed at $n_{th}$ time point among the time stamps of the messages, $b_n$ is the interarrival time of the message at $n_{th}$ time point among the time stamps of the messages;

for each respective time point of the series of time points, determining by the computer device a trending acceleration of the trending topic at the respective time point; and presenting by the computer device a time series of the trending accelerations of the trending topic.

16. The method of claim 15, wherein for each respective time point of the series of time points, the trending acceleration of the trending topic at the respective time point is determined based on a difference between the trending speed of the trending topic at the respective time point and a trending speed of the trending topic at a time point next to the respective time point in the series of time points.

17. A computer device comprising:

a processor;

a network interface via which the computer device can communicate with a social networking service;

a memory storing instructions that, when executed by the processor, cause the computer device to perform a process including:

retrieving multiple messages from the social networking service, the messages containing multiple trending topics;

for each respective trending topic of the trending topics, determining interarrival times of k messages of the messages, based on time stamps of the k messages, wherein the k messages are last k messages by the time point that contain the respective trending topic, and k is a predetermined number;

for each respective trending topic of the trending topics, determining a trending speed and a trending acceleration of the respective trending topic at a time point, wherein the trending speed of the respective trending topic at the time point is determined based on the interarrival times of the k messages by $$a'_n = \begin{cases} \left(a_n - \left(1 - \frac{1}{z_n+1}\right)\right) / (24 \cdot 60 \cdot 60), & a_n > 0, \\ \left(1 - \frac{1}{z_{n+1}}\right) / (24 \cdot 60 \cdot 60), & a_n = 0. \end{cases}$$

$$b_n = \alpha b_{n-1} + (1-\alpha) a'_n$$

$$v_n = \frac{k}{\sum_{i=n-k+1}^{n} b_n} \cdot (24 \cdot 60)$$

wherein $a_n$ is the interarrival time of the message at $n_{th}$ time point among the time stamps of the messages before a spreading a'$_n$ is the interarrival time of the message at $n_{th}$ time point among the time stamps of the messages after the spreading, $z_n$ is a number of messages that have the same time stamp as $n_{th}$ time point among the time stamps of the messages;

wherein $b_n$ is the interarrival time of the message at $n_{th}$ time point among the time stamps of the messages after an exponential smoothing, $\alpha$ is the predetermined smoothing factor; and wherein $v_n$ is the trending seed at $n_{th}$ time point among the time stamps of the messages; and presenting a treemap including multiple shapes;

wherein each respective shape of the shapes is associated with a corresponding trending topic of the trending topics, an area of the respective shape indicates a trending speed of the corresponding trending topic at the time point, and a property of the respective shape indicates a trending acceleration of the corresponding trending topic at the time point.

18. A method for presenting dynamic treemap of trending topics, the method comprising:

retrieving multiple messages from a social networking service, the messages containing multiple trending topics;

for each respective trending topic of the trending topics, determining interarrival times of k messages of the messages, based on time stamps of the k messages, wherein the k messages are last k messages by the time point that contain the respective trending topic, and k is a predetermined number, wherein the interarrival times of the k messages are generated by applying an exponential smoothing with a predetermined smoothing factor:

$$b_n = \alpha b_{n-1} + (1-\alpha) a'_n$$

wherein $b_n$ is the interarrival time of the message at $n_{th}$ time point among the time stamps of the messages after the exponential smoothing, a'$_n$ is the interarrival time of the message at $n_{th}$ time point among the time stamps of the messages before the exponential smoothing, $\alpha$ is the predetermined smoothing factor;

determining a trending speed and a trending acceleration at a time point, for each respective trending topic of the trending topics, wherein the trending speed of the respective trending topic at the time point is determined based on the interarrival times of the k messages; and presenting a treemap including multiple shapes;

wherein each respective shape of the shapes is associated with a corresponding trending topic of the trending topics, an area of the respective shape indicates a trending speed of the corresponding trending topic at the time point, and a color of the respective shape indicates a trending acceleration of the corresponding trending topic at the time point.

* * * * *